(12) United States Patent
Hayat

(10) Patent No.: US 9,053,318 B2
(45) Date of Patent: Jun. 9, 2015

(54) ANTI-CLONING SYSTEM AND METHOD

(71) Applicant: CallSign, Inc., Los Altos, CA (US)

(72) Inventor: Zia Hayat, Surrey (GB)

(73) Assignee: CallSign, Inc., Los Altos, CA (US)

( * ) Notice: Subject to any disclaimer, the term of this patent is extended or adjusted under 35 U.S.C. 154(b) by 228 days.

(21) Appl. No.: 13/939,488

(22) Filed: Jul. 11, 2013

(65) Prior Publication Data

US 2014/0026196 A1 Jan. 23, 2014

Related U.S. Application Data

(60) Provisional application No. 61/672,431, filed on Jul. 17, 2012.

(51) Int. Cl.
*H04L 29/06* (2006.01)
*G06F 21/44* (2013.01)
*G06F 21/10* (2013.01)
*G06F 21/12* (2013.01)

(52) U.S. Cl.
CPC .............. *G06F 21/44* (2013.01); *G06F 21/10* (2013.01); *G06F 21/128* (2013.01)

(58) Field of Classification Search
CPC ..... H04W 12/08; H04W 12/06; H04W 12/12; H04W 12/00; H04W 12/04; H04W 4/001; H04W 4/003; H04W 48/02; H04W 8/183; H04L 2209/603; H04L 63/0853; H04L 63/10; H04L 63/102; H04L 67/303; H04L 67/34; H04L 67/02; H04L 67/10; H04L 67/1095; H04L 67/14; H04L 65/1083; H04L 9/0866; H04L 9/002; H04L 9/3271; G06F 2221/2113; G06F 2221/2129; G06F 2221/0744; G06F 2221/2141; G06F 21/30; G06F 21/14; G06F 21/44; G06F 21/50; G06F 21/00; G06F 21/121; G06F 21/305; G06F 21/51; G06F 21/125; G06F 21/10; G06F 2209/541; G06Q 20/3227; Y10S 705/902; Y10S 705/911
USPC ............ 726/1, 26, 19, 4, 7, 2, 22, 29, 17, 27, 726/30; 705/59; 455/411, 410; 713/168, 713/171, 167
See application file for complete search history.

(56) References Cited

U.S. PATENT DOCUMENTS 8,051,297 B2 11/2011 Machani
8,244,799 B1 8/2012 Salusky et al.
(Continued)

FOREIGN PATENT DOCUMENTS

AU 2010101305 A4 12/2010
EP 0 715 245 A1 6/1996
WO 2007/047846 A2 4/2007

OTHER PUBLICATIONS

Hayat (2007). Ubiquitous security for ubiquitous computing. ScienceDirect. Retrieved Mar. 1, 2015 from http://ac.els-cdn.com/S1363412707000210/1-s2.0-S1363412707000210-main.pdf?_tid=1447b86c-b2be-11e4-b2b1-00000aab0f02&acdnat=1423749198_5123cd8ff9d81fd76631c58d6dbca4b5.*

(Continued)

*Primary Examiner* — Brian Shaw
(74) *Attorney, Agent, or Firm* — DLA Piper LLP (US)

(57) ABSTRACT

A method for authenticating a software application instance, the method includes a user device transmitting a request for access to a server device, wherein the request includes an App ID. The method further includes a server device transmitting a session ID to the user device and transmitting the session ID and the App ID to an anti-clone engine. The method further includes the anti-clone engine generating and transmitting a challenge token to the user device, and receiving and processing a response token to determine whether the user device is an authentic software application instance. The method further includes the anti-clone engine transmitting an authorization message to the server device.

60 Claims, 3 Drawing Sheets

(56) References Cited

U.S. PATENT DOCUMENTS

| | | |
|---|---|---|
| 8,260,710 B2 | 9/2012 | Lipsky et al. |
| 2009/0151007 A1 | 6/2009 | Koster et al. |
| 2011/0289003 A1 | 11/2011 | Womack et al. |
| 2012/0047074 A1 | 2/2012 | Indenbom |
| 2012/0215896 A1 | 8/2012 | Johannsen |

OTHER PUBLICATIONS http://www.arxan.com/products/bindit/—Jul. 8, 2013.

http://www.threatmetrix.com/docs/ThreatMetrix-TrustDefender-ID.pdf—Jul. 8, 2013.

http://www.enterasys.com/company/literature/device-profiling-sab.pdf—Jul. 8, 2013.

http://www.liveensure.com/—Jul. 8, 2013.

https://github.com/ylechelle/OpenDID—Jul. 8, 2013.

http://odin-project.eu—Jul. 8, 2013.

http://developer.apple.com/library#documentation/CoreFoundation/Reference/CFUUIDRef/Reference/reference—Jul. 8, 2013.

* cited by examiner

ANTI-CLONING SYSTEM AND METHOD

TECHNICAL FIELD

This disclosure is generally related to verifying the authenticity of mobile software applications executing on user devices, and more particularly to computer systems and methods for detecting and counteracting fraudulent cloned applications.

BACKGROUND

Recent developments in mobile computing technologies have given rise to personalized, sensitive and therefore valuable software applications ("Apps") configured for executing on mobile communication devices. For example, the banking, healthcare, entertainment and security industries have developed secured Apps that need a high degree of protection. In particular, it became desirable to "lock" a given software application instance so that it can only be executed on one authentic device. These measures are needed to counter the threat of App cloning, whereby a fraudulent party attempts to copy an App instance from an authentic user device to then run the cloned App instance, unauthorized, on another user device under the control of the fraudulent party. Cloned Apps may potentially enable the fraudulent party to gain unauthorized access to protected data.

In recent times, various attempts have been made to address the issue of App cloning. For example, some services try to identify the device on which an App instance is running via a method known as "device fingerprinting." Some device fingerprinting techniques involve attempting to uniquely identify a given software application with a high degree of accuracy, for example, each instance of the application may comprise a unique serial number. These techniques, however, are limited by the fact that they only allow a device to be identified via a given application. This flaw makes it easy for fraudulent parties to copy or clone the application, because copying an instance of the software application will also result in a copy of the fingerprint. Other fingerprinting techniques also rely on attributes of a mobile device, such as an IMEI (International Mobile Equipment Identity) number, phone number, email address, identifier of the processor and other device characteristics. In addition, various unique device characteristics such as the MAC (Media Access Control) address, memory, serial number and camera serial numbers may be used to create a user device fingerprint. Persistent cookies may also be used to fingerprint a user device. Once the device is fingerprinted, the fingerprint data may be checked every time the user device requests service. However, all of these methods have a major limitation in that they do not prevent fingerprint characteristics from being easily captured and replayed by a cloned App. Such a cloned App can defeat fingerprint security by providing a fake, replayed, fingerprint to the authorizing party.

Additionally, deep device fingerprinting techniques are currently used to validate App instances. Deep device fingerprinting techniques involve analyzing a set of dynamic characteristics, such as the location and the IP (Internet Protocol) address of a user device, to fingerprint a user device. This fingerprint is then checked to determine the likelihood of the App-device pair being authentic. However, deep device fingerprinting still fails to address the possibility of a fraudulent party capturing and replaying dynamic fingerprint characteristics of the authentic App/device combination.

Consequently, it is highly desirable to have a new type of App authentication/protection system that is not susceptible to fingerprint capture and replay (as in conventional systems), and is capable of detecting and counteracting cloned App instances.

SUMMARY

The present disclosure relates generally to a method and a system for authenticating a software application instance. In one embodiment, a user device, comprising a software application, transmits a request for access to a server device. The request may include an App ID (application identification) associated with the software application. The server device may then transmit a session ID (session identification) to the user device. The server device may then transmit the session ID and the App ID to an anti-clone engine. The anti-clone engine may, in turn, generate and transmit a challenge token to the user device, and receive a response token. The anti-clone engine may then process the response token to determine the authenticity of the software application and transmit an authorization message to said server device.

In another embodiment, an anti-clone engine may receive an App ID associated with a software application executing on a user device. The anti-clone engine may also receive a session ID associated with the software application. The anti-clone engine may then generate and transmit a challenge token to the user device. The challenge token may comprise the session ID and a random number. The anti-clone engine may then receive and process a response token from the user device to determine the authenticity of the software application. The anti-clone engine may then transmit an authorization message according to the determination.

In another embodiment, a system for authenticating a software application instance may comprise a user device, a server device and an anti-clone engine. In this embodiment, the user device is configured to transmit a request for access to a server device. The request may include an App ID associated with the software application. The server device may be configured to transmit a session ID to the user device. The server device may also be configured to transmit the session ID and the App ID to an anti-clone engine. The anti-clone engine may be configured to generate and transmit a challenge token to the user device, and receive a response token. The anti-clone engine may be further configured to process the response token to determine the authenticity of the software application and to transmit an authorization message to said server device.

In yet another embodiment, an anti-clone engine is used for authenticating a software application instance. The anti-clone engine may be configured to receive an App ID associated with a software application executing on a user device. The anti-clone engine may also be configured to receive a session ID associated with the software application. The anti-clone engine may further be configured to generate and transmit a challenge token to the user device. The challenge token may comprise the session ID and a random number. The anti-clone engine may be configured to receive and process a response token from the user device to determine the authenticity of the software application. The anti-clone engine may further be configured to then transmit an authorization message according to the determination.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
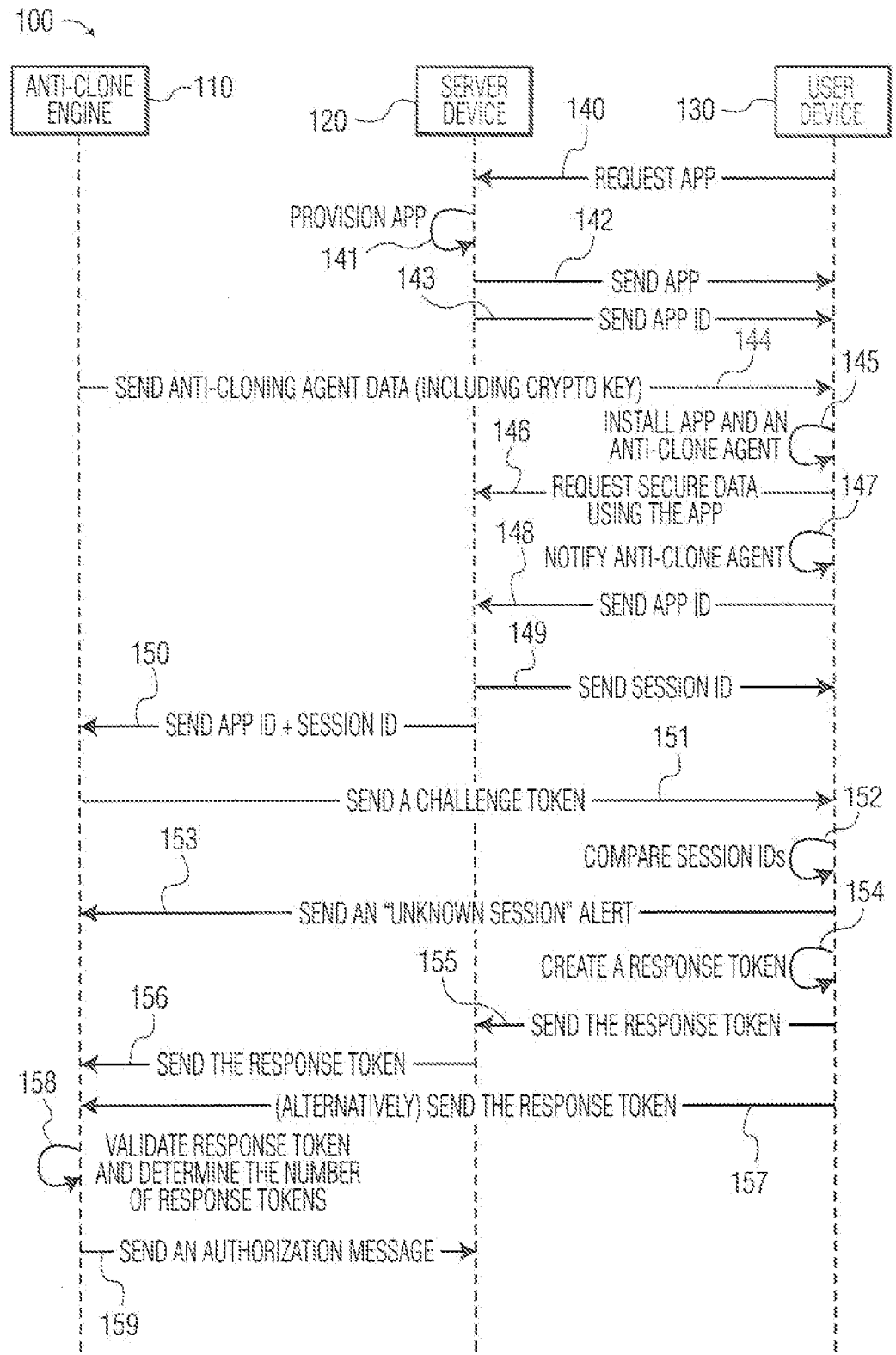
FIG. 1 is a sequence diagram illustrating an exemplary method for authenticating a software application instance.

The present disclosure relates generally to systems and methods for authenticating and preventing the cloning of a software application instance. The software application instance may be authenticated by a cryptographic challenge/response scheme that, for example, may leverage a persistent connection between the authenticating party and the application instance.

For purposes of this disclosure, a user device shall refer to any type of device configured for accessing, executing or otherwise using a software application. In one embodiment, the user device may be a smart phone, a laptop computer, a desktop computer, a tablet computer, a personal digital assistant, a workstation or a wearable computer. However, the user device may be any other type of computing device known in the art.

For purposes of this disclosure, an App shall mean a software application. In one embodiment, an App refers to a software application executing on a mobile device, such as a smart phone. However, in other embodiments the term App may refer to any kind of a software program designed to be executed on any type of a computing device. An App instance shall refer to one specific copy or implementation of the software application.

The term server device refers to any type of a computing device configured to provide any type of computing service to a remote user device. A server may be embodied on a single computing device, while in other embodiments, a server device may refer to a plurality of computing devices housed in one or more facilities that are configured to jointly provide remote computing services to one or more user devices.

An anti-clone engine shall refer to any kind of a computing module embodied in a non-transient computer readable medium, such as a server or another computing device, that is configured (among other things) to manage challenge/response process flows for authenticating App instances. In one embodiment, the anti-clone engine may be embodied on a server device that also provides data or services to the App. The anti-clone engine may also manage cryptographic materials used for authentication of an App instance.

An anti-clone agent shall refer to a component of an App that is configured for performing authentication functions of an App executing in connection with a given user device. The anti-clone agent may also include cryptographic material unique to a given App instance. In some embodiments, an anti-clone agent may be a standalone component, executing on the user device, that is associated with an App instance also executing on the user device.

A push notification network shall refer to any computer network that allows a server device to initiate "transactions" or functions with user devices. In one embodiment, a push notification network may refer to a cellular network that enables the server device to initiate data transmissions to user devices connected to the cellular network. In this embodiment, the cellular network may maintain a persistent connection with the user devices which may be leveraged to allow server devices to send messages to the user devices without having first received a request from the user devices. In other embodiments, a push notification network may refer to a persistent Internet connection that allows server devices to initiate communications with user devices. In yet another embodiment, a push notification network may refer to any kind of a network connection that allows server devices to initiate communications with user devices.

Application Authentication Method

In a first exemplary implementation, the present disclosure relates to a method of authenticating an App instance. As an initial step, the method includes a user device transmitting a request for access to a server device. In one embodiment, the request may be initiated by a user. In another embodiment, the request may be initiated automatically via, for example, an App executing on the user device. The request for access may comprise a request for secure user data stored on the server device, a request for the server device to provide a service to the user device, or any other type of access request known in the art. The request may be sent over the Internet, over a Wi-Fi connection, over a cellular network or via any other wired or wireless connection or network known in the art. An anti-clone agent associated with the App may also be notified that the request for access was initiated/transmitted.

In one embodiment, the request for access may include an App ID (application identification) that is associated with an App executing on the user device. The App ID may be created during the provisioning or installation of the App on the user device. Alternatively, the App ID may be created by the server device that provides the App and/or services associated with the App to the user device. The App ID may be created in such a fashion as to uniquely identify the combination of the App and the user device.

Optionally, the App ID may be used to address messages to the App executing on the user device. For example, the App ID may refer to an address of the App within a persistent push notification network. In one embodiment, the App ID may be an address of the App/device combination within one of the Apple® Push Notification Service, Android® Cloud to Device Messaging Service, Microsoft® Push Notification Service or the Blackberry® Push Service address. Alternatively, the App ID may refer to an address within a proprietary push notification service. In this embodiment, the server device and, optionally, an anti-clone engine may address messages to the App executing on the user device over a push notification network by using the App ID as a unique address of the App. The server device and the anti-clone engine may establish and maintain a persistent communication connection to the App executing on the user device over the push notification network.

Once the request for access is transmitted, the server device may initiate a session and transmit a session ID (session identification) to the user device. The session ID may uniquely identify the session between the user device and server device, that was initiated by the request for access. The server device may then transmit the session ID and the App ID to the anti-clone engine over any kind of a wired or wireless network. In one embodiment, where the anti-clone engine is embodied on the server device, the session ID and the App ID may be transmitted internally from one program executing on the server device to the anti-clone engine.

Once the session ID and the App ID are received, the anti-clone engine may generate a challenge token. This challenge token may comprise the session ID and a randomly generated number. However, in other embodiments, the challenge token may comprise other types of information that may be used in a challenge/response scheme. Once the challenge token is generated, the anti-clone engine may transmit the challenge token to the user device. In one embodiment, the challenge token may be transmitted via a persistent push notification service, with the App ID used as an address. However, in other embodiments, the challenge token may be transmitted via other wired or wireless networks.

Upon receiving the challenge token, the user device may compare the session ID received from the server device and the session ID included in the challenge token. If the comparison fails, the user device may send an "unknown session" alert to the anti-clone engine and/or the server device. The "unknown session" alert may indicate that a cloned instance of the App is running on an unauthorized device. In another embodiment, the user device may send an "unknown session" alert if the user device receives a challenge token without having sent a request for service.

In another embodiment, once the challenge token is received, the user device may generate a response token. The response token may include a number generated by transforming the random number included in the challenge token. In another embodiment, the random number may be transformed via a predetermined mathematical function. For example, a hashing function may be used to transform the random number, however other mathematical functions, known in the art, may also be used to transform the random number. Alternatively, the response token may be generated by transforming other information or data included in the challenge token in other ways known in the art. The response token may then be transmitted to the anti-clone agent, either directly, or via the server device. The response token may be transmitted via any kind of a wireless or wired network.

Upon receiving the response token, the anti-clone engine may process the response token to determine whether the App instance that is requesting service is authentic. In one embodiment, the anti-clone engine may extract the transformed random number from the response token and verify that number's validity. This may be accomplished, for example, by applying the same function to the random number as was applied by the user device. If the response token is determined not to have proper information, for example if the transformed random number does not match the expected value, the anti-clone engine may determine that the App instance is not authentic.

In another embodiment, the anti-clone engine may determine the number of response tokens received in response to the challenge token. Receiving multiple response tokens may indicate that there are cloned App instances executing on unauthorized devices. Thus, if multiple response tokens are received, the anti-clone engine may determine that the App instance is not authentic.

In yet another embodiment, if the response token contains expected data, such as a properly transformed random number, and only a single response token was received, the anti-clone engine may determine that the App instance is authentic.

Once the response token is processed, the anti-clone engine may send an authorization message to the server device. If the App instance was determined to be authentic, the authorization message may comprise a confirmation message informing the server device that it may provide access to the user device. The server device may then grant the access request of the user device.

If, however, the App instance was determined not to be authentic (e.g., if the response token included unexpected data or if multiple response tokens are received), the authorization message may comprise a warning message informing the server device that there may be one or more cloned App instances operating on unauthorized devices. If the warning message is received by the server device, the server device may deny the access request of the user device.

In another embodiment, the anti-clone engine may, after receiving the App ID from the server device, determine whether this App ID is listed in a "bad files" list. In one embodiment, the "bad files" list may comprise a list of App IDs that were previously determined to be compromised or cloned. If the App ID is found in the "bad files" list, the anti-clone engine may send an authorization message comprising a warning message to the server device.

An anti-clone agent may be installed on the user device during provisioning of the App. The anti-clone agent may include a plurality of cryptographic keys. In such an embodiment, the challenge token may be encrypted by the anti-clone engine prior to transmission. The anti-clone agent may then use one or more of its cryptographic keys to decrypt the challenge token. One or more of these cryptographic keys may be used to encrypt the response token generated by the user device. The cryptographic keys may comprise any number of symmetrical or asymmetrical cryptographic keys known in the art. For example, the plurality of cryptographic keys may comprise RSA (Rivest-Shamir-Adleman) or DES (Data Encryption Standard) keys.

In one embodiment, the anti-clone agent may optionally also be configured to verify if the operating system of the user device was improperly modified (or otherwise compromised) prior to the request for access being transmitted. For example, the anti-clone agent may verify the core functionalities of the operating system and the integrity of the system call table of the user device. If the anti-clone agent determines that the operating system is compromised, the anti-clone agent may prevent the request for access from being sent. Alternatively, the anti-clone agent may send a "compromised operating system warning" message to the server device or to the anti-clone engine. The anti-clone engine may then send an authorization message comprising a warning message to the server device.

Anti-Clone Engine (Process)

In a second exemplary implementation, the present disclosure relates to a method performed by the anti-clone engine to authenticate an App instance. As an initial step, the method includes receiving an App ID by the anti-clone engine. The App ID may be created in such a fashion as to uniquely identify a combination of an App and a user device. Optionally, the App ID may be used to address messages to the App executing on the user device. For example, the App ID may refer to an address of the App within a persistent push notification network. As note above, the App ID may be an address of the App/device combination within one of the Apple® Push Notification Service, Android® Cloud to Device Messaging Service, Microsoft® Push Notification Service or the Blackberry® Push Service address. Alternatively, the App ID may refer to an address within any proprietary push notification service. In this embodiment, the anti-clone engine may address messages to the App executing on the user device over a push notification network by using the App ID as a unique address of the App. The anti-clone engine may establish and maintain a persistent communication connection to the App executing on the user device over a push notification network.

The anti-clone engine may, after receiving the App ID from the server device, determine whether this App ID is listed in a "bad files" list, defined above. If the App ID is found in the "bad files" list, the anti-clone engine may send an authorization message comprising a warning message to the server device.

Optionally, the anti-clone engine may also receive a session ID. The session ID may be associated with a software application. In one embodiment, the session ID may be a unique identifier for a session between the user device and the server device that was initiated by the request for access sent by the user device.

Once the session ID and the App ID are received, the anti-clone engine may generate a challenge token. This challenge token may comprise a session ID and a randomly generated number. However, in other embodiments, the challenge token may also comprise other information or data that may be used in a challenge/response authentication scheme.

Once the challenge token is generated, the anti-clone engine may transmit the challenge token to the user device. In one embodiment, the challenge token may be transmitted via a persistent push notification service, with the App ID used as an address. However, in other embodiments, the challenge token may be transmitted via other wired or wireless networks. The anti-clone engine may then receive a response token from the user device. The response token may be generated by the user device, and may comprise a transformed random number. In one embodiment, the transformed random number may be generated by a predetermined mathematical function, such as a hashing function.

Once the response token is received, the anti-clone engine may process the response token to determine whether the App instance that is requesting service is authentic. To do this, the anti-clone engine may be configured to extract the transformed random number from the response token and verify its validity. This may be accomplished, for example, by applying the same function to the random number as was applied by the user device. If the response token is determined not to contain proper information, for example if the transformed random number does not match the expected value, the anti-clone engine may determine that the App instance is not authentic. However, if the response token contains expected data, such as a properly transformed random number, and only a single response token was received, the anti-clone engine may determine that the App instance is authentic. In another embodiment, the anti-clone engine may determine that the number of response tokens received in response to its challenge token is inappropriate. Thus, the receipt of multiple response tokens may indicate that there are cloned App instances executing on unauthorized devices. In one embodiment, if multiple response tokens are received, the anti-clone engine may determine that the App instance is not authentic.

Once the response token is processed, the anti-clone engine may send an authorization message to the server device. If the App instance was determined to be authentic, the authorization message may comprise a confirmation message informing the server device that it may provide access to the user device. If, however, the App instance was determined not to be authentic, the authorization message may comprise a warning message informing the server device that there may be cloned App instances operating on unauthorized devices, and/or to deny access to the user device.

App Authentication System

In a third exemplary implementation, a computer system for authenticating an App instance may comprise a user device, a server device and an anti-clone engine. Each of the server device, the user device and the anti-clone engine may comprise processors configured to execute instructions stored on a non-transitory memory. Execution of the instructions may cause the user device, server device and anti-clone engine to perform any of the features described above, and those further described below.

The user device may be configured to transmit a request for access to a server device. This request may be initiated by a user or it may be initiated automatically via, for example, an App executing on the user device. The request for access may comprise a request to access secure user data stored on a server device, a request for the server device to provide a service to the user device, and/or any other type of access request known in the art. The user device may further be configured to send the request over the Internet, over a Wi-Fi connection, over a cellular network or via any other wired or wireless connection or network known in the art. The user device may also comprise an anti-clone agent associated with the App, which may also be notified that the request for access was sent.

In one embodiment, the request for access may include an App ID that is associated with an App executing on the user device. The App ID may be created during the provisioning or installation of the App on user device by a server device that supports the functionality of the App, and/or in any other manner described herein, or available in the art.

The server device may be configured to initiate a session and transmit a session ID to the user device when it receives the request for access from the user device. The session ID may uniquely identify the session between the user device and server device, that was initiated by the request for access.

The server device may further be configured to transmit the session ID and the App ID to the anti-clone engine over any kind of a wired or wireless network (if the anti-clone engine is embodied in a computing device that is separate from the server device). If, however, the anti-clone engine is embodied in the server device, the server device may be configured to transmit the session ID and the App ID internally from one program executing on the server device to the anti-clone engine.

The anti-clone engine may be configured to generate a challenge token once it receives the session ID and the App ID. In one embodiment, the challenge token may comprise a session ID and a randomly generated number. However, in other embodiments, the challenge token may comprise other data and/or information that may be used in a challenge/response scheme. The anti-clone engine may further be configured to transmit the challenge token to the user device via a persistent push notification service, with the App ID used as an address. However, in other embodiments, the anti-clone engine may be configured to transmit the challenge token via, for example, other wired or wireless networks.

In one embodiment, the user device may be configured to compare the session ID received from the server device and the session ID included in the challenge token, once the challenge token is received. If the comparison fails, the user device may be configured to transmit an "unknown session" alert to the anti-clone engine and/or the server device. The "unknown session" alert may indicate that a cloned instance of the App is running on an unauthorized device. In another embodiment, the user device may be configured to send an "unknown session" alert if the user device receives a challenge token without having sent a request for service.

The user device may further be configured to generate a response token once the challenge token is received. The response token may include a number generated by transforming the random number contained in the challenge token via a predetermined mathematical function, such as a hashing function. However, other functions known in the art may be used to transform the random number. Alternatively, the user device may be configured to generate the response token by transforming the challenge token in other ways known in the art. The user device may also be configured to transmit the response token to the anti-clone engine, either directly, or via the server device. The user device may also be configured to transmit the response token via any kind of a wireless or a wired network.

The anti-clone engine may be configured to receive and process the response token to determine whether the App instance that is requesting service is authentic. This may be accomplished, for example, by extracting the transformed random number from the response token and verifying its validity. For example, the anti-clone engine may be configured to apply the same mathematical function to the random number as was applied by the user device. If the response token is determined not to have proper information, for example, if the transformed random number does not match the expected value, the anti-clone engine may determine that the App instance is not authentic.

The anti-clone engine may also be configured to determine the number of response tokens received in response to its challenge token. Receiving multiple response tokens may indicate that there are cloned App instances executing on unauthorized devices. Thus, if the anti-clone engine receives multiple response tokens, the anti-clone engine may determine that an App Instance is not authentic. The anti-clone engine may be configured to determine that an App instance is authentic if the response token includes expected data, such as a properly transformed random number, and only a single response token was received.

The anti-clone engine may further be configured to transmit an authorization message to the server device once the response token is processed. If the App instance was determined to be authentic, the authorization message may comprise a confirmation message informing the server device that it may provide access to the user device. The server device may, in turn, be configured to grant the access request to user device according to the confirmation message. However, if the App instance was determined not to be authentic, the authorization message may comprise a warning message informing the server device that there may be cloned App instances operating on unauthorized devices. The server device may, in turn, be configured to deny the access request to the user device according to the warning message.

Optionally, the anti-clone engine may also be configured to determine whether the App ID is listed in a "bad files" list (defined above) after receiving the App ID from the server device. If the App ID is found in the "bad files" list, the anti-clone engine may be configured to send an authorization message comprising a warning message to the server device.

The user device may comprise an anti-clone agent embodied thereon. For example, the anti-clone agent may have been installed during provisioning of the App. The anti-clone agent may comprise a plurality of cryptographic keys. Thus, if the anti-clone engine encrypts the challenge token prior to transmission, the anti-clone agent may be configured to use one or more of its cryptographic keys to decrypt the challenge token. One or more of these cryptographic keys may also be used to encrypt the response token generated by the App. The cryptographic keys may comprise any number of symmetrical or asymmetrical cryptographic keys known in the art. For example, the plurality of cryptographic keys may comprise RSA (Rivest-Shamir-Adleman) or DES (Data Encryption Standard) keys.

The anti-clone agent may further be configured to verify if the operating system of the user device was improperly modified or otherwise compromised prior to the transmission of request for access. For example, the anti-clone agent may be configured to verify the core functionalities of the operating system and the integrity of a call table to determine if any unauthorized modifications were made. If the anti-clone agent determines that the operating system is compromised, the anti-clone agent may be configured to prevent the request for access from being transmitted. Alternatively, the anti-clone agent may be configured to transmit a "compromised operating system" warning message to the server device and/or to the anti-clone engine. The anti-clone engine may be configured to send an authorization message comprising a warning message to the server device if it receives a "compromised operating system" warning message.

Anti-Clone Engine Apparatus

In a fourth exemplary implementation, an anti-clone engine may be configured to authenticate an App instance. The anti-clone engine may comprise one or more processors configured to execute instructions stored on a non-transitory memory. Execution of these instructions may cause the anti-clone engine to perform any of the features described above, and those further described below.

The anti-clone engine may be configured to receive an App ID. The App ID may be created and/or configured as previously described above. As a result, the anti-clone engine may be configured to address messages to an App executing on a user device over a push notification network by using the App ID) as the unique address of the App. The anti-clone engine may also establish and maintain a persistent communication connection to the App executing on the user device over a push notification network.

The anti-clone engine may also be configured to determine whether an App ID is listed in a "bad files" list and to send an authorization message comprising a warning message to a server device if such a determination is made. In addition, the anti-clone engine may be configured to receive a session ID associated with a software application. The session ID may be a unique identifier for a session between a user device and a server device that was initiated by the request for access sent by the user device.

The anti-clone engine may further be configured to generate a challenge token, that comprises, for example, a session ID and a randomly generated number. However, in other embodiments, the challenge token may also comprise other data and/or information that may be used in a challenge/response scheme. The anti-clone engine may be configured to transmit the challenge token to the user device via, for example, a persistent push notification service, with the App ID used as an address. However, in other embodiments, the anti-clone engine may be configured to send the challenge token via other wired or wireless networks.

In one embodiment, the anti-clone engine may be configured to receive and/or process a response token from the user device to determine whether the App instance that is requesting service is authentic. In one embodiment, the anti-clone engine may be configured to extract the transformed random number from the response token and to verify the validity of a transformed random number. This may be accomplished, for example, by applying the same function to the random number as was applied by the user device. If the response token is determined not to contain proper information, for example, if the transformed random number does not match the expected value, the anti-clone engine may be configured to determine that the App instance is not authentic. In another embodiment, the anti-clone engine may also be configured to determine the number of response tokens received in response to sending out the challenge token. If multiple response tokens are received, the anti-clone engine may be configured to determine that the App instance is not authentic.

In another embodiment, if the response token contains expected data, such as a properly transformed random number, and only a single response token was received, the anti-clone engine may be configured to determine that the App instance is authentic.

The anti-clone engine may also be configured to send an authorization message to the server device. If, for example, the App instance was determined to be authentic, the authorization message may comprise a confirmation message informing the server device that it may provide access to the user device. However, if the App instance was determined to not be authentic, the authorization message may comprise a warning message informing the server device that there may be cloned App instances operating on unauthorized devices, and/or to deny the access request.

Turning now to FIG. 1, an exemplary method 100 for authenticating an App instance is shown. The sequence diagram of FIG. 1 demonstrates an exemplary sequence of steps performed by an anti-clone engine 110, a server device 120 and a user device 130 configured according to this disclosure. Each of the anti-clone engine 110, the server device 120 and the user device 130 may comprise one or more computing devices that include non-transitory memory for storing instructions and a processor for executing the instructions to perform the steps of the illustrated method 100.

At 140, the user device may request installation of an App. In one embodiment, the user device 130 may request an App directly in response to user input, in other embodiment the user device 130 may request the App automatically. In one embodiment, the user device 130 is a smartphone that may request an App in response to the user ordering the App from an App store.

At 141, the server device 120 may provision the requested App. The provisioning of an App may include configuring the specific App instance intended to only be executed on the user device 130. For example, the server device 120 may create an App ID that will combine App identifying information and user device 130 identifying information to create a single ID that may uniquely identify the combination of the App instance and the user device 130. In one embodiment, the App ID may serve as an address for a push notification network. In this embodiment, the server device 120 and/or the anti-clone engine 110 may send messages to the user device 130 via a push notification network using App ID as an address.

At 142, the server device 120 may send App instance data to the user device 130. The App instance data may be used to install the App on the user device 130. At 143, the App ID, that uniquely identifies the App/user device 130 combination, may be sent to the user device 130. Step 143 may occur concurrently with step 142. At 144, the anti-clone engine 110 may send anti-clone agent data to the user device 130. The anti-clone agent data may include cryptographic keys that may be unique to the user device 130. These keys may be used to encrypt and decrypt further communications between the anti-clone engine 110 and the user device 130.

At 145, the user device 130 may install the App. The user device 130 may also, at this time, install the anti-clone agent. The anti-clone agent may be installed as a part of the App, or as a standalone service executing separately from the App.

At 146, the App executing on the user device 130 may request secure data from the server device 120. For example, the App may request banking data, healthcare data, or any other type of secure data or service. At 147, the App may notify the anti-clone agent, executing on the user device 130, that a request for secure data was made. The anti-clone agent may then verify the integrity of the operation system of the user device 130 to ensure that the system has not been compromised. At 148, the App executing on the user device 130 may send the App ID to the server device 120. This step may be performed concurrently with step 146.

At 149, the server device 120 may create a unique session ID that may identify the session started by the request for secure data at step 146. The server device 120 may then send the session ID to the user device 130. At 150, the server device 120 may send both the session ID and the App ID to the anti-clone engine 110 to verify the authenticity of the App/user device 130 combination that requested the secure data.

At 151, the anti-clone engine 110 may generate and transmit a challenge token to the user device 130. In one embodiment, the challenge token may comprise a session ID and a randomly generated number. However, in other embodiments, the challenge token may comprise other data or information that may be used in a challenge/response scheme. Optionally, the challenge token may be sent via a persistent push notification service, with the App ID used as an address. The challenge token may be encrypted.

At 152, the user device 130 may receive the challenge token and decrypt it using the keys provided with the anti-clone agent. The user device 130 may then compare the session ID included in the challenge token with the session ID received at step 143. At 153, if the session IDs do not match, or if the user device 130 has never requested any secure data (and thus did not receive a session ID), the user device 130 may send an "unknown session" warning to the anti-clone engine 110.

At 154, the user device 130 may create a response token. The response token may be generated, for example, by transforming the random number contained in the challenge token. At 155, the response token may be sent to the server device 120. Then, at 156, the server device 120 may send the response token to the anti-clone engine 110. Alternatively, at 157, the user device 130 may send the response token directly to the anti-clone engine 110.

At 158, the anti-clone engine 110 may validate the response token. In one embodiment, the anti-clone engine 110 may transform the random number included in the response token in the same manner that the user device 130 transformed the random number. The anti-clone engine 110 may then verify the transformed random number by comparing it to an expected value. If the response token validation fails, the anti-clone engine 110 may determine that there are unauthorized cloned versions of the App currently in operation. Additionally, the anti-clone engine 110 may determine the number of response tokens that are received in response to sending a single challenge token. If multiple response tokens were received, the anti-clone engine 110 may determine that there are unauthorized cloned versions of the App currently in operation.

At 159, the anti-clone engine 110 may send an authorization message to the server. In one embodiment, the authorization message may comprise a confirmation message, if the App executing on the user service 130 was determined to be authentic. In another embodiment, the authorization message may comprise a warning message if the App was determined not to be authentic or if there are unauthorized cloned versions of the App currently in operation. The server device 120 may then decide to either grant or deny the request for secure data based on the content of the authorization message.

Figure 2:
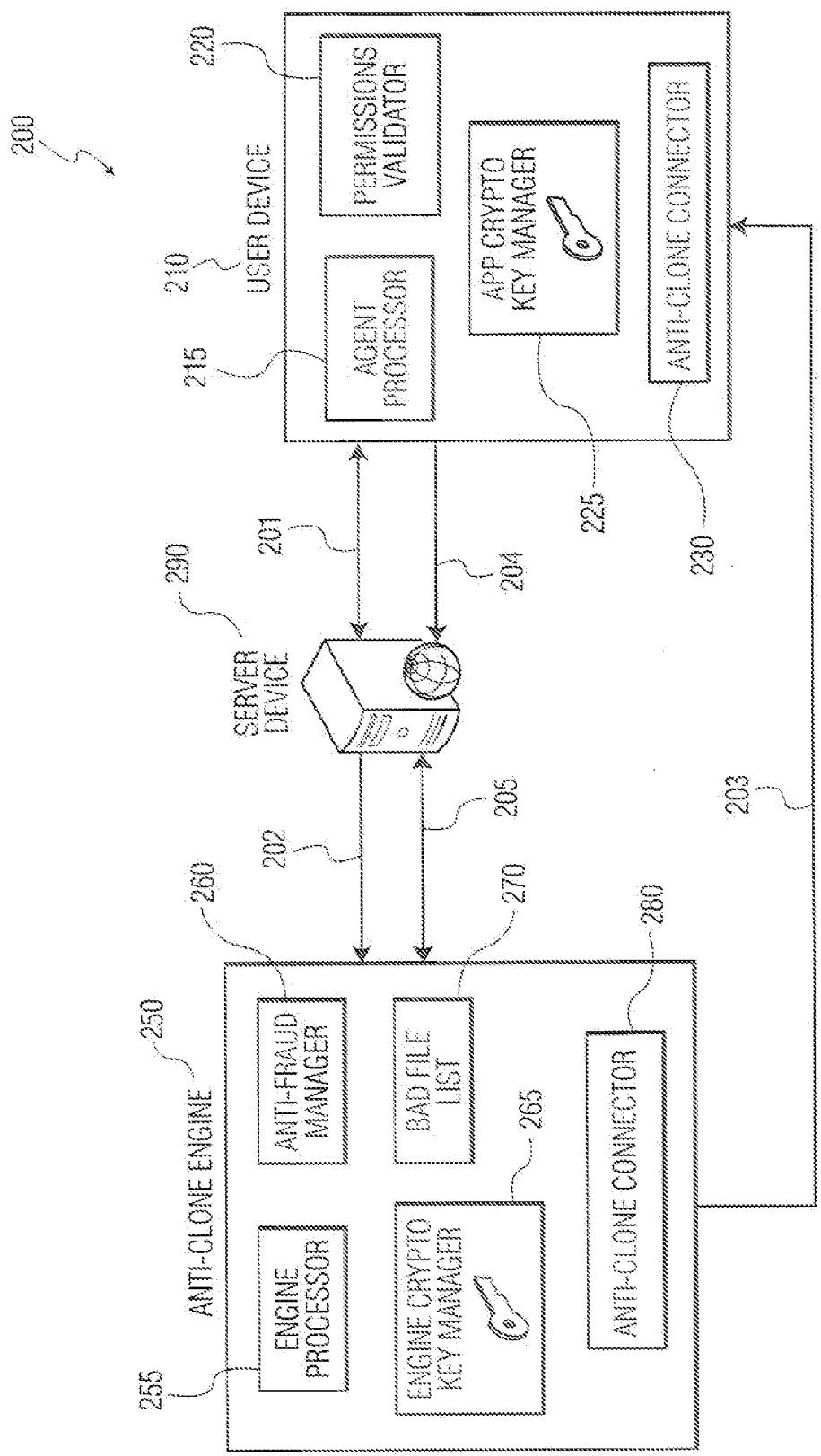
FIG. 2 is a block diagram illustrating an exemplary system for authenticating a software application instance.

Turning now to FIG. 2, an exemplary system 200 for authenticating an App instance according to this disclosure is shown. The system 200 comprises an anti-clone engine 250, a server device 290 and a user device 210. These elements may be connected by one or more wired or wireless networks. Each of the anti-clone engine 250, a server device 290 and a user device 210 may comprise one or more computing devices that include a non-transitory memory for storing instructions and a processor for executing the instructions.

The anti-clone engine 250 may be configured to ensure that the server device 290 will provide secure data only to App/user device pairs that are authentic. The anti-clone engine 250 may comprise an engine processor module 255. The engine processor module 255 may be configured to receive and manage all requests to perform an App authenticity checks and/or anti-cloning checks. The engine processor module 255 may be configured to generate validation challenges that can be sent to the user device 210. The engine processor module 255 may be further configured to validate responses received from the user device 210. The engine processor module 255 may also be configured to generate results for anti-cloning checks that can be used to inform the server device 290 about the results of the App authenticity verification.

The anti-clone engine 250 may comprise a "bad files" list 270. The "bad files" list 270 may be configured to comprise a list of App/device pairs that were, for any reason, determined to be fraudulent or non-authentic. The engine processor module 255 may be configured to generate and transmit a warning message to the server device 290 each time it determines that an App/device pair is present in the "bad files" list.

The anti-clone engine 250 may further comprise an anti-fraud manager module 260. The anti-fraud manager module 260 may be configured to comprise customizable rules which can be used by the anti-clone engine 250 to identify potentially fraudulent (or cloned) App/device pairs. For example, the anti-fraud manager module 260 may be configured to determined that a certain App/device pair requests authorization with abnormal frequency. Such an App-device pair may then be added to the "bad files" list 270.

The anti-clone engine 250 may further comprise an engine cryptographic key manager module 265. The engine cryptographic key manager module 265 may be configured to generate and store cryptographic keys for use in connection with anti-cloning related data that is communicated to or received from other system 200 components such as the user device 210 and the server device 290.

The anti-clone engine 250 may further comprise an engine anti-clone connector module 280. The engine anti-clone connector module 280 may be configured to maintain a persistent and trusted data connection with the user device 210. In one embodiment, the persistent connection may be based on push notification services provided by other parties such as Apple™, Google™, BlackBerry™ and Microsoft™. In one embodiment, the engine anti-clone connector module 280 may be configured to send validation challenges generated by the engine processor module 255.

The server device 290 may be configured to receive access requests from the user device 210. The server device 290 may further be configured to seek verification of authenticity from the anti-clone engine 250 before fulfilling access requests.

The user device 210 may comprise an App that may be configured to request secure data access from the server device 290. In one embodiment, the App may comprise an anti-clone agent that in turn comprises various modules that enable the App authentication functionality. In another embodiment the user device 210 may comprises a standalone anti-clone agent executing separately from the App.

The user device 210 may comprise an agent processor module 215. The agent processor module 215 may be configured to manage all requests for authenticity checks and anti-cloning checks from the anti-clone engine 250 and the server device 290. For example, the agent processor module 215 may be configured to process validation challenges, and generate validation responses.

The user device 210 may comprise an app anti-clone connector module 230. The app anti-clone connector module 230 may be configured to maintain a persistent and trusted data connection with the anti-clone engine 250. In one embodiment, this connection may be based upon push notification services from other parties such as Apple™, Google™, Blackberry™ and Microsoft™. In one embodiment, the app anti-clone connector module 230 may be configured to receive validation challenges from the anti-clone engine 250 over a persistent push notification service.

The user device 210 may comprise an app cryptographic key manager module 225. The App cryptographic key manager module 225 may be configured to store cryptographic keys for use in connection with anti-cloning related data. For example, the cryptographic keys stored by the App cryptographic key manager module 225 may be used to decrypt the validation challenges received from the anti-clone engine 250.

The user device 210 may comprise a permissions validator module 220. The permissions validator module 220 may be configured to analyse the core operating system functions to ensure that no unauthorized modifications have been made that affect critical functionality, such as push notification subscription and delivery. For example, the permissions validator module 220 may be configured to analyse the system call table of the user device 210.

In one embodiment, the user device 210 may be configured to send an initial data request to the server device 290, and receive a session identifier in return 201. The server device 290 may be configured to then initiate a validation of the App/user device 210 pair that initiated the request 202. The anti-clone engine 250 may be configured to create and transmit a validation challenge 203 to the user device 210. The user device 210 may be configured to process the validation challenge and send a validation response 204 to the server device 290. The server device 290 may forward the validation response to the anti-clone engine 250, and receive a determination of App/user device 210 pair authenticity in return 205.

Figure 3:
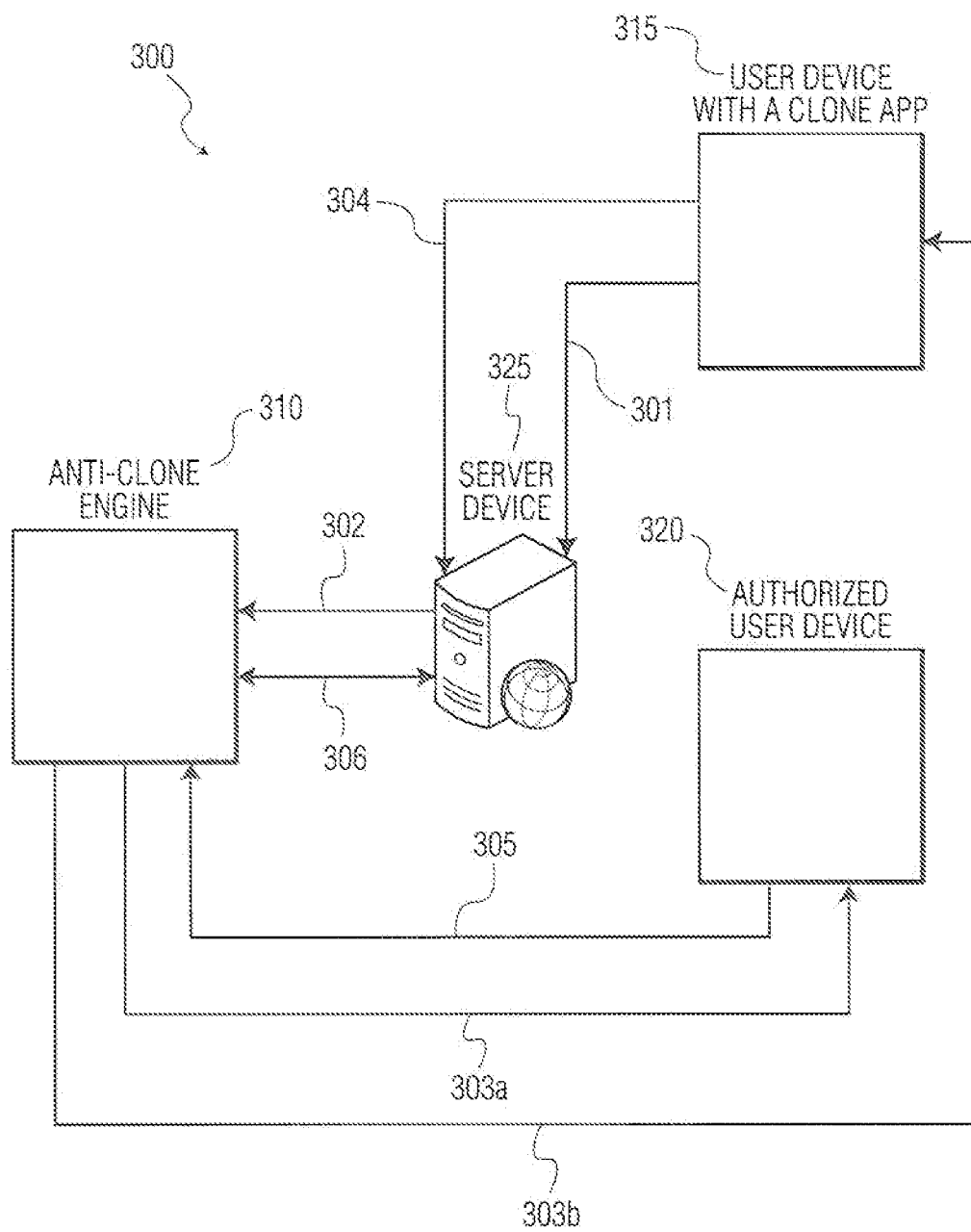
FIG. 3 is a block diagram illustrating another exemplary system for authenticating a software application instance.

Turning now to FIG. 3, an exemplary system 300 for authenticating an App instance according to this disclosure is shown. In particular, FIG. 3 demonstrates an exemplary configuration of the system 300 when an unauthorized device running an unapproved cloned instance of an App is present.

The system 300 comprises an anti-clone engine 310, a server device 325, an authorized user device 320 and an unauthorized device 315 running an unapproved cloned instance of an App.

In this embodiment, the unauthorized device 315 may be configured to initiate a fraudulent request for service 301. The server device 325 may be configured to then initiate a validation of the App/user device 320 pair that initiated the request 302. The anti-clone engine 310 may be configured to generate and send a validation challenge to the unauthorized App/user device pair 315 that has initiated the request 303b. However, since the unauthorized user device 315 is running a version of the App that was cloned, the authorized user device 320 will also receive this validation challenge 303a.

Since, the unauthorized user device 315 is running a cloned App, it may be configured to process the validation challenge and send a correct challenge response 304 to the server device 325. However, the authorized user device 320 may be configured to send a "unknown session warning" message 305 to the anti-clone engine 310 if it receives a validation challenge without having initiated a request for service. The anti-clone engine 310 may be configured to send a warning message 306 to the server device 325 if it receives such an "unknown session warning." The server device 325 may be further configured to deny the request for service by the unauthorized device 315 if a warning message was received.

Additionally, the authorized user device 320 may be configured to check system calls for push messages and to prevent message blocking. The authorized user device 320 may also be configured to ensure that data connections of the user device 300 cannot be turned off while the App is running. These measures may be used to counter a possibility of a persistent malware being installed on the authorized user device 320, that may try to prevent the authorized user device 320 from sending an "unknown session" alert. Consequently, the implementation of the system for authenticating an App instance 300 may prevent an unauthorized device 315 from improperly gaining access to the server device 325.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method for authenticating a software application instance, the method comprising:
    transmitting, by a user device comprising a software application instance, a request for access to at least one server device, said request including application identification data (App ID) associated with said software application instance;
    responsive to the transmitting, the at least one server device:
        receiving the request,
        transmitting session identification data (session ID) to the user device, and
        transmitting the session ID and the App ID to an anti-clone engine, said anti-clone engine being embodied in a non-transient computer readable medium; and
    the anti-clone engine:
        responsive to the receiving the transmitted session ID and the App ID,
        generating and transmitting a challenge token to the user device,
        receiving at least one response token from said user device, processing the at least one response token to determine whether the software application instance comprises an authentic instance of said software application, wherein the software application instance is determined not to be authentic if an unexpected number of response tokens are received, and
        transmitting an authorization message to said server device according to said determination.

2. The method of claim 1, wherein the authorization message comprises a confirmation message if the software application instance is determined to be authentic.

3. The method of claim 2, further comprising the server device granting access to the user device.

4. The method of claim 1, wherein the authorization message comprises a warning message if the software application instance is determined not to be authentic.

5. The method of claim 4, further comprising the server device denying access to the user device.

6. The method of claim 1, wherein the anti-clone engine is embodied in the server device.

7. The method of claim 1, wherein the App ID is created by the server device during provisioning of the software application instance.

8. The method of claim 1, wherein the challenge token comprises the session ID and a random number.

9. The method of claim 1, wherein the challenge token is transmitted via a persistent push notification service.

10. The method of claim 9, wherein the App ID uniquely identifies a combination of the user device and the software application instance, and wherein the App ID is configured for addressing messages to the user device via the persistent push notification service.

11. The method of claim 9, wherein the persistent push notification service comprises at least one of the following services: Apple® Push Notification Service, Android® Cloud to Device Messaging Service, Microsoft® Push Notification Service, Blackberry® Push Service, a proprietary push notification service.

12. The method of claim 8, further comprising the user device: comparing the session ID transmitted by the server and the session ID contained in the challenge token; and transmitting an unknown session alert to the server device if the comparison fails.

13. The method of claim 8, wherein the user device receives the challenge token without having generated the request for service, the method further comprising: said user device generating and transmitting an unknown session alert to at least one of the server device and the anti-clone engine.

14. The method of claim 8, further comprising the user device: transforming the random number; and generating the response token that includes the transformed random number.

15. The method of claim 14, further comprising the user device transmitting the response token directly to the anti-clone engine.

16. The method of claim 14, further comprising: the user device transmitting the response token to the server device; and the server device transmitting the response token to the anti-clone engine.

17. The method of claim 14, wherein the anti-clone engine processing the response token comprises verifying the transformed random number.

18. The method of claim 1, further composing installing an anti-clone agent on the user device, an anti-clone agent being associated with the software application instance.

19. The method of claim 18, wherein the challenge token and the response tokens are encrypted, and wherein the anti-clone agent comprises one or more cryptographic keys for decrypting the challenge token and encrypting the response token.

20. The method of claim 18, further comprising the anti-clone agent verifying whether operating system of the user device was compromised prior to the user device transmitting the request for access to the server device.

21. The method of claim 1, further comprising the anti-clone engine determining whether the App ID is listed in a bad files list prior to transmitting the challenge token to the user device.

22. A method of authenticating a software application instance, the method comprising:
    receiving, by an anti-clone engine, application identification data (App ID) associated with a software application instance executing on a user device, said anti-clone engine being embodied in a non-transient computer readable medium;
    receiving, by said anti-clone engine and by said user device, session identification data (session ID) associated with the software application instance;

responsive to the receiving of the App ID and the session ID, said anti-clone engine:
  generating and transmitting a challenge token to the user device, the challenge token comprising the session ID and a random number;
  receiving at least one response token from said user device,
  processing the at least one response token to determine whether the software application instance comprises an authentic instance of said software application, wherein the software application instance is determined not be authentic if an unexpected number of response tokens are received, and
  transmitting an authorization message according to said determination.

23. The method of claim 22, wherein the authorization message comprises a confirmation message if the software application instance is determined to be authentic.

24. The method of claim 22, wherein the authorization message comprises a warning message if the software application instance is determined not to be authentic.

25. The method of claim 22, wherein the challenge token is transmitted via a persistent push notification service.

26. The method of claim 22, wherein the App ID uniquely identifies a combination of the user device and the software application instance, and wherein the App ID is configured for addressing messages to the user device via the persistent push notification service.

27. The method of claim 26, wherein the persistent push notification service is one of the following services: Apple® Push Notification Service, Android® Cloud to Device Messaging Service, Microsoft® Push Notification Service, Blackberry® Push Service, a proprietary push notification service.

28. The method of claim 22, wherein the response token comprises a transformed random number generated by the user device.

29. The method of claim 28, wherein processing the response token comprises verifying the transformed random number.

30. The method of claim 22, further comprising determining whether the App ID is listed in a bad files list prior to transmitting the challenge token to the user device.

31. A system for authenticating a software application instance, the system comprising: a user device; a server device; and an anti-clone engine, embodied in a non-transient computer readable medium; said user device comprising a software application instance configured to: transmit a request for access to a server device, said request including application identification data (App ID) associated with said software application instance; responsive to the transmission of the request, said server device, configured to: receive the request, transmit session identification data (session ID) to the user device, and transmit the session ID and the App ID to an anti-clone engine; and said anti-clone engine, configured to: responsive to the receipt of the transmitted session ID and the App ID, generate and transmit a challenge token to the user device, receive at least one response token from said user device, process the at least one response token to determine whether the software application instance comprises an authentic instance of said software application, wherein the software application instance is determined not to be authentic if an unexpected number of response tokens are received, and transmit an authorization message to said server device according to said determination.

32. The system of claim 31, wherein the authorization message comprises a confirmation message if the software application instance is determined to be authentic.

33. The system of claim 32, wherein the server device is further configured to grant access to the user device.

34. The system of claim 31, wherein the authorization message comprises a warning message if the software application instance is determined not to be authentic.

35. The system of claim 34, wherein the server device is further configured to deny access to the user device.

36. The system of claim 31, wherein the anti-clone engine is embodied in the server device.

37. The system of claim 31, wherein the server device is further configured to create the App ID during provisioning of the software application instance.

38. The system of claim 31, wherein the challenge token comprises the session ID and a random number.

39. The system of claim 31, wherein the challenge token is transmitted via a persistent push notification service.

40. The system of claim 39, wherein the App ID uniquely identifies a combination of the user device and the software application instance, and wherein the App ID is configured for addressing messages to the user device via the persistent push notification service.

41. The system of claim 39, wherein the persistent push notification service comprises at least one of the following services: Apple® Push Notification Service, Android® Cloud to Device Messaging Service, Microsoft® Push Notification Service, Blackberry® Push Service, a proprietary push notification service.

42. The system of claim 38, wherein the user device is further configured to: compare the session ID transmitted by the server and the session ID contained in the challenge token; and transmit an unknown session alert to the server device if the comparison fails.

43. The system of claim 38, the user device is further configured to: generate and transmit an unknown session alert to at least one of the server device and the anti-clone engine if the user device receives the challenge token without having generated the request for service.

44. The system of claim 38, wherein the user device is further configured to: transform the random number; and generate the response token that includes the transformed random number.

45. The system of claim 44, wherein the user device is further configured to transmit the response token directly to the anti-clone engine.

46. The system of claim 44, wherein the user device is further configured to transmit the response token to the server device; and wherein the server device is further configured to transmit the response token to the anti-clone engine.

47. The system of claim 44, wherein the anti-clone engine is further configured to process the response token by verifying the transformed random number.

48. The system of claim 31, the user device comprises an anti-clone agent associated with the software application instance.

49. The system of claim 48, wherein the challenge token and the response tokens are encrypted, and wherein the anti-clone agent comprises one or more cryptographic keys for decrypting the challenge token and encrypting the response token.

50. The system of claim 48, wherein the anti-clone agent is configured to verify whether an operating system of the user device was compromised prior to the user device transmitting the request for access to the server device.

51. The system of claim 31, wherein the anti-clone engine is configured to determine whether the App ID is listed in a bad files list prior to transmitting the challenge token to the user device.

52. An anti-clone engine, embodied in a non-transient computer readable medium, the anti-clone engine being configured to: receive application identification data (App ID) associated with a software application instance executing on a user device; receive session identification data (session ID) associated with the software application instance; responsive to the receiving of the App ID and the session ID, said anti-clone engine being further configured to: generate and transmit a challenge token to the user device, the challenge token comprising the session ID and a random number; receive at least one response token from said user device; process the at least one response token to determine whether the software application instance comprises an authentic instance of said software application, wherein the software application instance is determined not to be authentic if an unexpected number of response tokens are received; and transmit an authorization message according to said determination.

53. The anti-clone engine of claim 52, wherein the authorization message comprises a confirmation message if the software application instance is determined to be authentic.

54. The anti-clone engine of claim 52, wherein the authorization message comprises a warning message if the software application instance is determined not to be authentic.

55. The anti-clone engine of claim 52, wherein the anti-clone engine is configured to transmit the challenge token is via a persistent push notification service.

56. The anti-clone engine of claim 52, wherein the App ID uniquely identifies a combination of the user device and the software application instance, and wherein the App ID is configured for addressing messages to the user device via the persistent push notification service.

57. The anti-clone engine of claim 56, wherein the persistent push notification service is one of the following services: Apple® Push Notification Service, Android® Cloud to Device Messaging Service, Microsoft® Push Notification Service, Blackberry® Push Service, a proprietary push notification service.

58. The anti-clone engine of claim 52, wherein the response token comprises a transformed random number.

59. The anti-clone engine of claim 58, wherein the anti-clone engine is configured to process the response token by verifying the transformed random number.

60. The anti-clone engine of claim 52, wherein the anti-clone engine is configured to determine whether the App ID is listed in a bad files list prior to transmitting the challenge token.

* * * * *